L. S. EDLEBLUTE.
Improvement in Revolving Horse-Rakes.

No. 132,457. Patented Oct. 22, 1872.

WITNESSES.
INVENTOR.

UNITED STATES PATENT OFFICE.

LUCIUS S. EDLEBLUTE, OF TULLAHOMA, TENNESSEE.

IMPROVEMENT IN REVOLVING HORSE-RAKES.

Specification forming part of Letters Patent No. 132,457, dated October 22, 1872.

*To all whom it may concern:*

Be it known that I, LUCIUS S. EDLEBLUTE, of Tullahoma, in the county of Coffee and State of Tennessee, have invented a new and valuable Improvement in Hay-Rakes; and I do hereby declare that the following is a full, clear, and exact description of the construction and operation of the same, reference being had to the annexed drawing making a part of this specification, and to the letters and figures of reference marked thereon.

Figure 1:
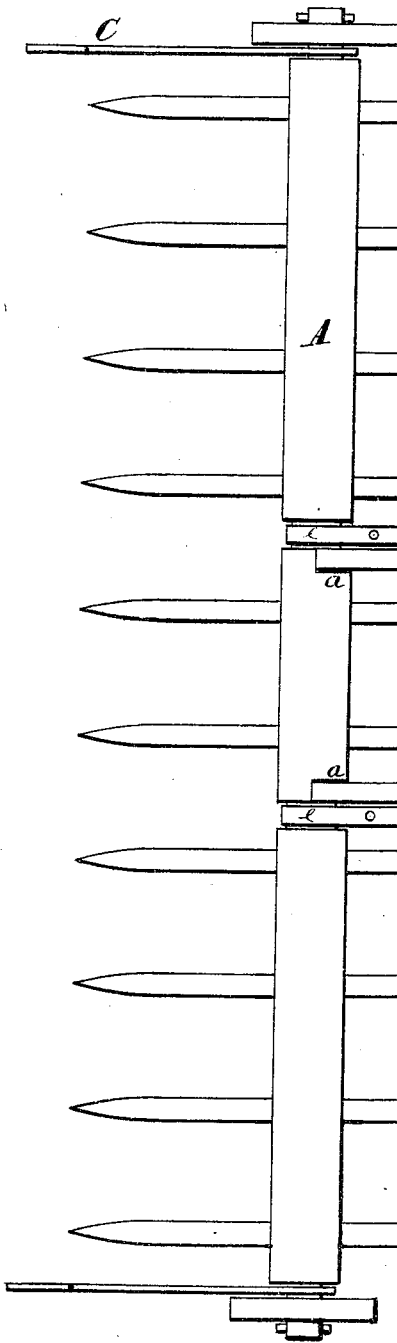
Figure 2:
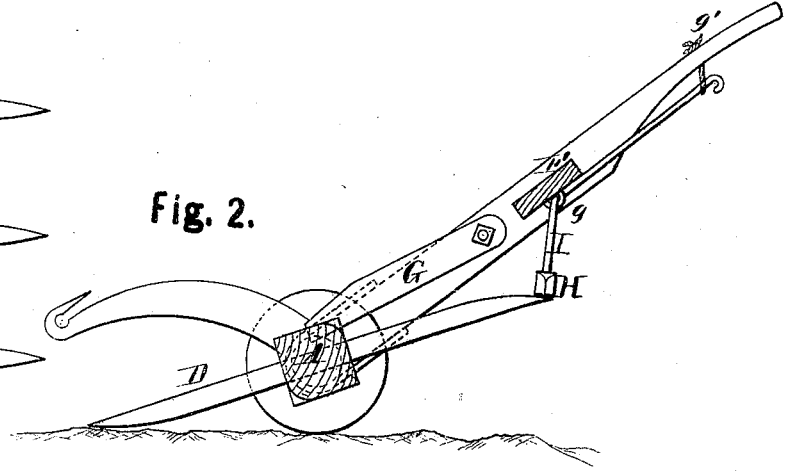

Figure 1 of the drawing is a representation of a top view of my invention. Fig. 2 is a vertical section of my invention.

My invention has relation to revolving horse hay-rakes; and it consists in the construction and novel arrangement of the bent lever with foot, pawls, perforated handle, and cord, constituting devices for controlling the movement of the toothed bar, substantially as hereinafter described.

Referring to the accompanying drawing, A represents the tooth-bar; B B, the wheel upon which the same is mounted; C C, tug-hooks, by means of which the rake is drawn; D, the rake-teeth, passing through the bar A, and equal on both sides. E indicates the handles by means of which the rake is guided and dumped when loaded, these handles having metal loops $e$ on their ends, which fit grooves in the bar A and allow the latter to turn. F designates the cross-piece uniting the handles. G G are dogs, pivoted to the inner sides of the handles, and arranged with their forward ends resting in notches $a$ cut in the sides of the bar A, and assist in dumping the hay. These notches are beveled, and run from the corners of the bar toward the middle part, as shown. H designates a foot, attached to the lower end of rod I, which is bent underneath the bar F, carried lengthwise of and pivoted to the same by means of staples $g$, and near one of the handles bent and extended back underneath said handle, as shown. A cord, $g'$, is attached to this extension, and passed through a hole, $a'$, in the handle, above which it is knotted to prevent it from coming out.

When the teeth are in a position for raking, the foot H acts as a stop to prevent the teeth and bar from turning over in the direction to drop the load. At the same time the dogs G prevent the bar and teeth from turning over in the opposite direction. Thus the rake is held in a perfectly rigid position for work.

When a load has accumulated, the operator draws the cord $g'$ upward, and thus releases the foot H from the teeth. The bar A will then turn over and deposit the load, after which, the cord being released, the foot H will regain its position, while the dogs fall into their proper notches.

Sometimes I construct the rake with one handle only. I then pivot the dogs to both sides and attach the foot H to an L-shaped rod which I pivot to the under side of the handle, and apply the cord as before specified.

What I claim as my invention, and desire to secure by Letters Patent, is—

In a horse hay-rake having the revolving tooth-bar A, the perforated handle E, and the gravitating stop H having the bent lever I pivoted to said handle, and connected at its upper end with said handle by means of the operating-cord $g'$ sliding through the handle-perforation $a'$, all constructed and arranged as set forth.

In testimony that I claim the above I have hereunto subscribed my name in the presence of two witnesses.

LUCIUS S. EDLEBLUTE.

Witnesses:
J. L. RHOADES,
HIRAM SUPHER.